(12) United States Patent
Dugan

(10) Patent No.: US 11,688,045 B2
(45) Date of Patent: Jun. 27, 2023

(54) METHODS AND APPARATUS FOR REMOVING SATELLITE TRAILS FROM IMAGES

(71) Applicant: Owen M. Dugan, Sleepy Hollow, NY (US)

(72) Inventor: Owen M. Dugan, Sleepy Hollow, NY (US)

( * ) Notice: Subject to any disclaimer, the term of this patent is extended or adjusted under 35 U.S.C. 154(b) by 0 days.

(21) Appl. No.: 17/096,945

(22) Filed: Nov. 12, 2020

(65) Prior Publication Data

US 2021/0142451 A1 May 13, 2021

Related U.S. Application Data

(60) Provisional application No. 62/934,518, filed on Nov. 12, 2019.

(51) Int. Cl.
| | |
|---|---|
| *G06T 5/00* | (2006.01) |
| *G06T 5/50* | (2006.01) |
| *G06T 3/40* | (2006.01) |
| *G06T 7/60* | (2017.01) |
| *G06T 7/73* | (2017.01) |
| *G02B 23/00* | (2006.01) |

(52) U.S. Cl.
CPC ............... *G06T 5/005* (2013.01); *G06T 3/40* (2013.01); *G06T 5/50* (2013.01); *G06T 7/60* (2013.01); *G06T 7/73* (2017.01); *G02B 23/00* (2013.01); *G06T 2207/20224* (2013.01)

(58) Field of Classification Search
CPC .. G06T 5/005; G06T 3/40; G06T 5/50; G06T 7/60; G06T 7/73; G06T 2207/20224; G06T 2207/20208; G02B 23/00; G06V 10/273; G06V 30/155; G06K 9/00
USPC ........................................ 382/103, 254, 275
See application file for complete search history.

(56) References Cited

U.S. PATENT DOCUMENTS

| | | | |
|---|---|---|---|
| 2006/0110007 A1* | 5/2006 | Yanagisawa | G06K 9/50 |
| | | | 382/103 |
| 2017/0140239 A1* | 5/2017 | Saito | G06K 9/4604 |
| 2018/0357753 A1 | 12/2018 | Lehtinen et al. | |
| 2022/0383614 A1 | 12/2022 | Wu et al. | |

OTHER PUBLICATIONS

Melchior, Peter, et al. "Crowdsourcing quality control for Dark Energy Survey images." Astronomy and Computing 16 (2016): 99-108. (Year: 2016).*

(Continued)

*Primary Examiner* — Geoffrey E Summers
(74) *Attorney, Agent, or Firm* — Dugan & Dugan, PC

(57) ABSTRACT

A method for removing satellite trails from images includes the following: obtaining an initial image having stars, locating stars in the image, removing the located stars from the initial image to form a star-removed image, locating the satellite trail in the star-removed image, determining brightness information for the satellite trail in the initial image, creating a satellite-trail-containing image with only satellite trail brightness information based on the determined brightness information, and subtracting the satellite-trail-containing image from the initial image to remove the satellite trail so as to form a satellite-trail-removed image. Systems for removing satellite trails from images are also provided, as are other aspects.

20 Claims, 5 Drawing Sheets

(56) References Cited

OTHER PUBLICATIONS

Privett, G., et al. "Automated Extraction of Satellite Trails from Wide Angle CCD Imagery." Revista Mexicana de Astronomia y Astrofisica Conference Series. vol. 51. 2019. (Year: 2019).*

Desai, Shantanu, et al. "Detection and removal of artifacts in astronomical images." Astronomy and computing 16 (2016): 67-78. (Year: 2016).*

"Gaussian Function." Wikipedia. (Year: 2007).*

Hainaut, O. "Retouching of astronomical data for the production of outreach images." May 20, 2009. <https://www.eso.org/~ohainaut/images/imageProc.html> (Year: 2009).*

Hallas, Tony. "What to do about satellite trails." Jan. 23, 2012. Astronomy.com (Year: 2012).*

Morganson, E., et al. "The dark energy survey image processing pipeline." Publications of the Astronomical Society of the Pacific 130.989 (2018): 074501. (Year: 2018).*

Sease, Bradley Jason. Data Reduction for Diverse Optical Observers Through Fundamental Dynamic and Geometric Analysis. Diss. Virginia Tech, 2016. (Year: 2016).*

Stetson, Peter B. "Daophot: A computer program for crowded-field stellar photometry." Publications of the Astronomical Society of the Pacific 99.613 (1987): 191. (Year: 1987).*

"Subtract, v." OED Online, Oxford University Press, Jun. 2022, www.oed.com/view/Entry/193201. Accessed Jun. 24, 2022. (Year: 2022).*

Richard S. Wright Jr., "Satellites, Begone! Remove Trails From Your Astrophotography", Jun. 2019, Skyandtelescope.org, https://skyandtelescope.org/astronomy-blogs/imaging-foundations-richard-wright/satellites-begone-how-to-remove-satellite-trails-from-your-astrophotography/ (Year: 2019).

Matt Hill, "4 Ways to remove airplanes from star stacks", Aug. 2018, nationparksatnight.com, https://www.nationalparksatnight.com/blog/2018/8/18/four-ways-to-remove-airplanes-from-star-trails-in-post-production (Year: 2018).

Paillassa et al., "MaxiMask and MaxTrack: Two new tools for identifying contaminants in astronomical images using convolutional neural networks", 2020, Astronomy Astrophysics, https://arxiv.org/pdf/1907.08298 (Year: 2020).

PixInsightReferenceDocumentation, "Rejection Maps", 2013, Pixinsight.com, https://pixinsight.com/doc/tools/ImageIntegration/ImageIntegration.html#usage_008 (Year: 2013).

* cited by examiner

METHODS AND APPARATUS FOR REMOVING SATELLITE TRAILS FROM IMAGES

CROSS REFERENCE TO RELATED APPLICATION

This claims the benefit of U.S. Provisional Patent Application No. 62/934,518, filed Nov. 12, 2019, the disclosure of which is hereby incorporated herein by reference in its entirety for all purposes.

FIELD

The present application relates to removing satellite trails from images.

BACKGROUND

When a satellite passes through a portion of a sky being imaged, it can result in inaccurate photometry measurements for the captured image. A need exists for removing satellite trails from images.

SUMMARY

In some embodiments, a method of removing a satellite trail from an image is provided that includes the following: obtaining an initial image having stars, locating stars in the image, removing the located stars from the initial image to form a star-removed image, locating the satellite trail in the star-removed image, determining brightness information for the satellite trail in the initial image, creating a satellite-trail-containing image with only satellite trail brightness information based on the determined brightness information, and subtracting the satellite-trail-containing image from the initial image to remove the satellite trail so as to form a satellite-trail-removed image.

In some embodiments, a system for removing a satellite trail from an image is provided that includes a telescope having an imaging device. The system also includes a controller in communication with the telescope. The controller includes a memory for storing instructions that when executed by the controller cause the controller to perform the following: receive an initial image having stars, locate stars in the image, remove the located stars from the initial image to form a star-removed image, locate the satellite trail in the star-removed image, determine brightness information for the satellite trail in the initial image, create a satellite-trail-containing image with only satellite trail brightness information based on the determined brightness information, and subtract the satellite-trail-containing image from the initial image to remove the satellite trail so as to form a satellite-trail-removed image.

Other features and aspects of the present invention will become more fully apparent from the following detailed description, the appended claims, and the accompanying drawings

BRIEF DESCRIPTION OF DRAWINGS

The drawings, described below, are for illustrative purposes and are not necessarily drawn to scale. Accordingly, the drawings and descriptions are to be regarded as illustrative in nature, and not as restrictive. The drawings are not intended to limit the scope of the invention in any way.

DETAILED DESCRIPTION

In accordance with one or more embodiments provided herein, methods and apparatus are provided for removing satellite trails from images.

Figure 1:
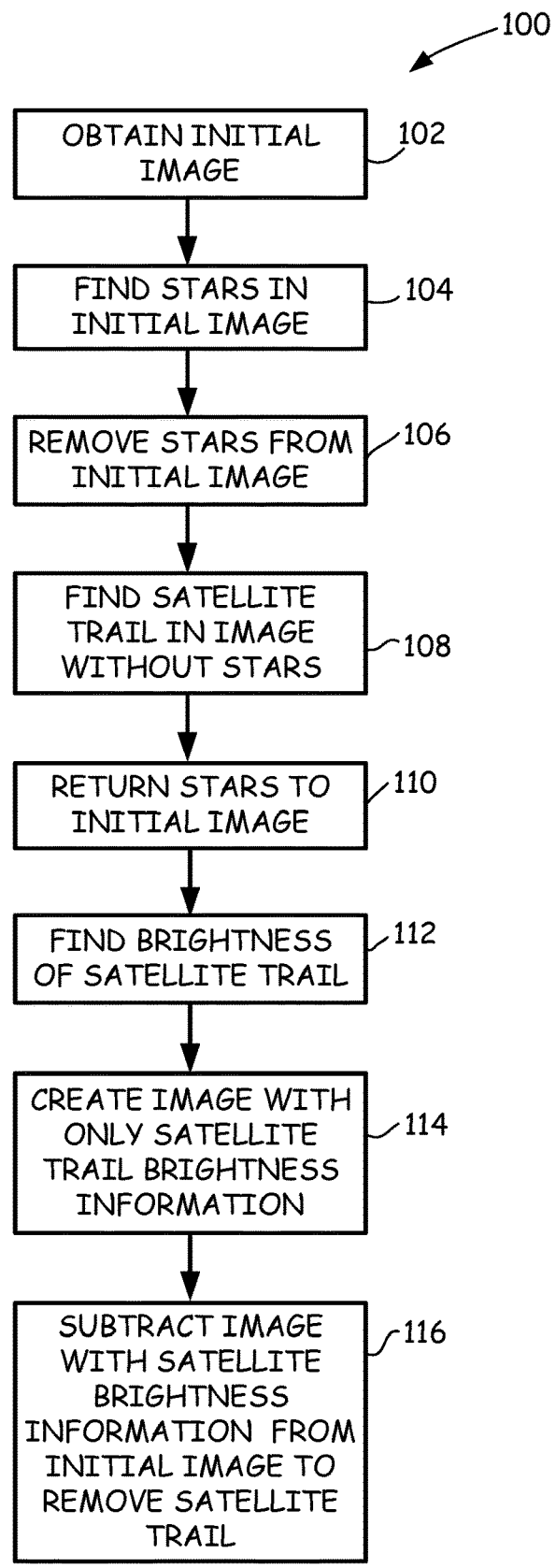
FIG. 1 illustrates a flowchart of a method of removing satellite trails from an image according to embodiments provided herein.

FIG. 1 illustrates an example method 100 of removing satellite trails from an image in accordance with embodiments provided herein. With reference to FIG. 1, at Block 102, an initial image is obtained (e.g., FIG. 2A). For example, a FIT, FITS, or other file type image containing stars may be obtained. In Block 104, stars within the image are located. In some embodiments, the image may be plate solved to obtain the location of the stars within the image. Other techniques for locating the stars may be used.

Figure 2A:
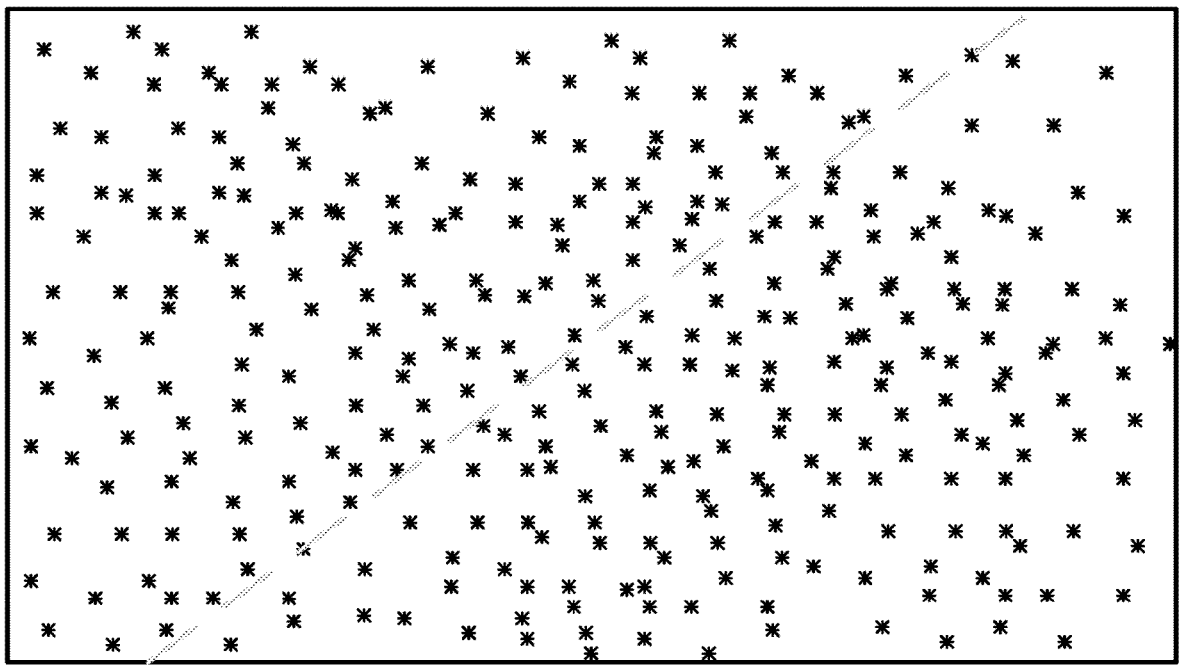
FIG. 2A illustrates an initial image having stars according to embodiments provided herein.
Figure 2B:
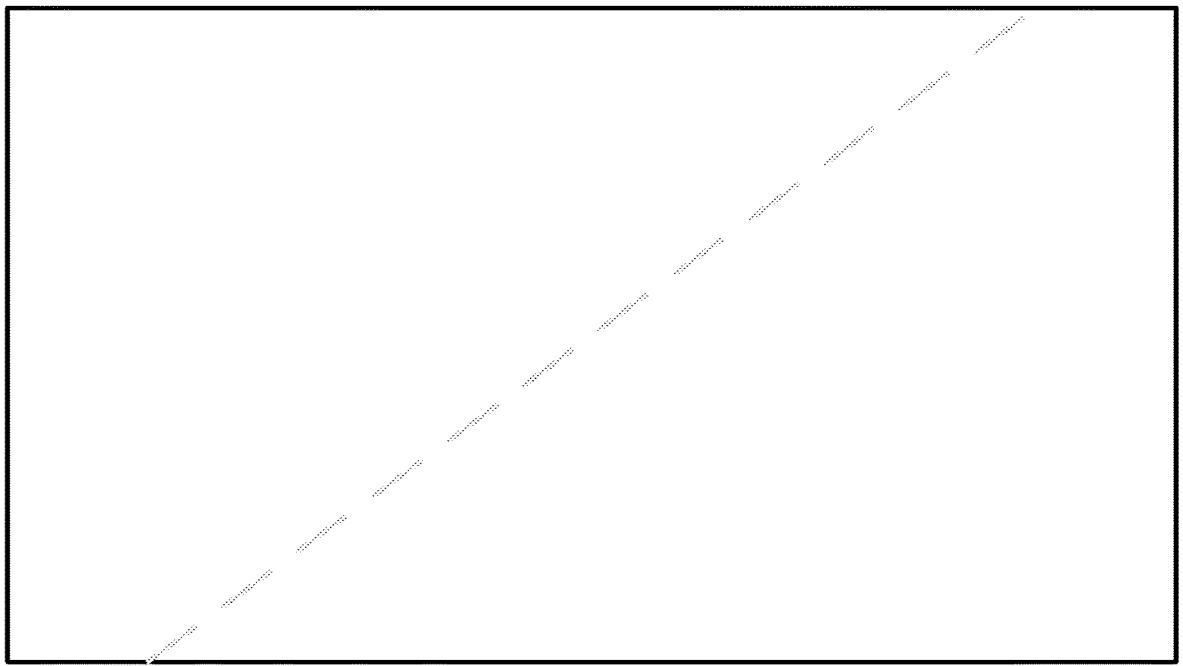
FIG. 2B illustrates the image of FIG. 2A with the stars removed according to embodiments provided herein.

In Block 106, stars are removed from the initial image (FIG. 2B). In some embodiments, the radius of each star may be determined by detecting when the brightness of the star drops as a function of radial distance from the star's center. For example, brightness of the star may be detected near the center of the star, and then at incrementally further radial distances from the star's center to determine the boundary of the star. In one particular embodiment, the brightness at multiple (e.g., 4-10) equally spaced points at the same radial distance may be averaged to determine an average brightness at that radial distance. If the brightness is below the median brightness of background, the radial distance may be used as the boundary for the star.

Once the radius of each star to be removed has been determined, all points within the star up to the determined radius may be changed to a reduced brightness level (e.g., a median brightness for the image, or another suitable brightness level). This effectively removes the star from the image. This may be repeated for each star in the image.

Figure 2C:
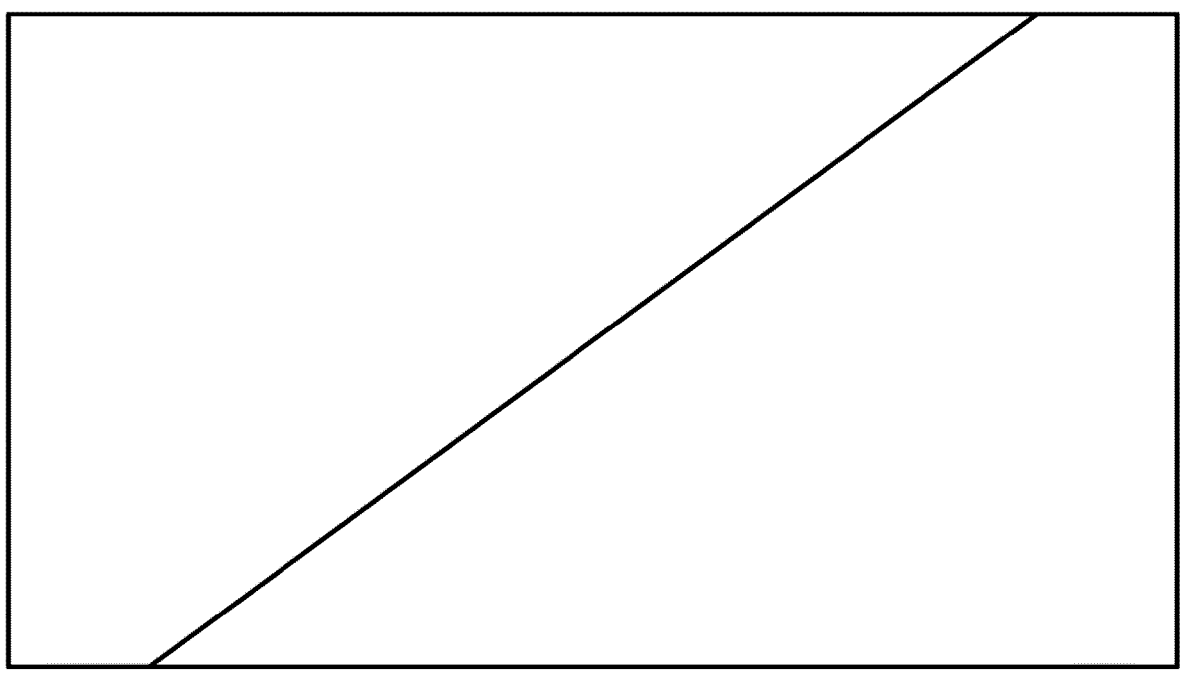
FIG. 2C illustrates the image of FIG. 2B with a satellite trail located according to embodiments provided herein.

In Block 108, the satellite trail is located in the image in which the stars were removed (FIG. 2C). In some embodiments, all lines going in and out of the image through lattice points may be examined to determine the line with the highest average brightness. For large (high resolution) images, this may require millions or even tens of millions of lines to be examined. Some embodiments may test lines that lie between lattice points. To speed up identification of the brightest line (e.g., the satellite trail), in some embodiments, the resolution of the image may be reduced until a smaller number (e.g., under 20,000) of lines extend through the image. Once the brightest line is identified within the reduced resolution image, the resolution of the image may be increased and the line location information may be refined in the higher resolution image. In some embodiments, the resolution of the image may be repeatedly decreased until the satellite trail location is identified and then repeatedly increased to refine the accuracy of the satellite trail location. For example, the image's resolution may be decreased by a factor of ⅒, ¼, ½, etc., and/or increased by a factor of 2, 4, 10, etc. Other resolution adjustment factors may be used.

Figure 2D:
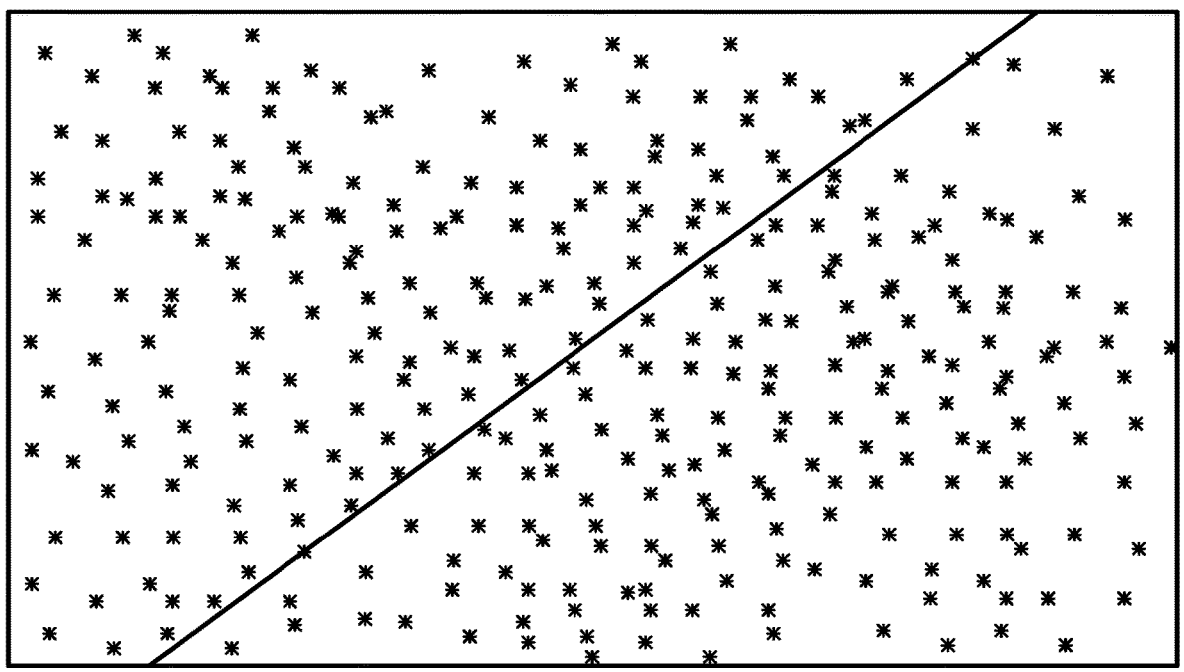
FIG. 2D illustrates the image of FIG. 2C with the stars returned according to embodiments provided herein.

In Block 110, once the satellite trail has been identified in the image, the stars may be returned to the image (e.g., the original brightness values of the stars may be returned to the image) (FIG. 2D).

Figure 2E:
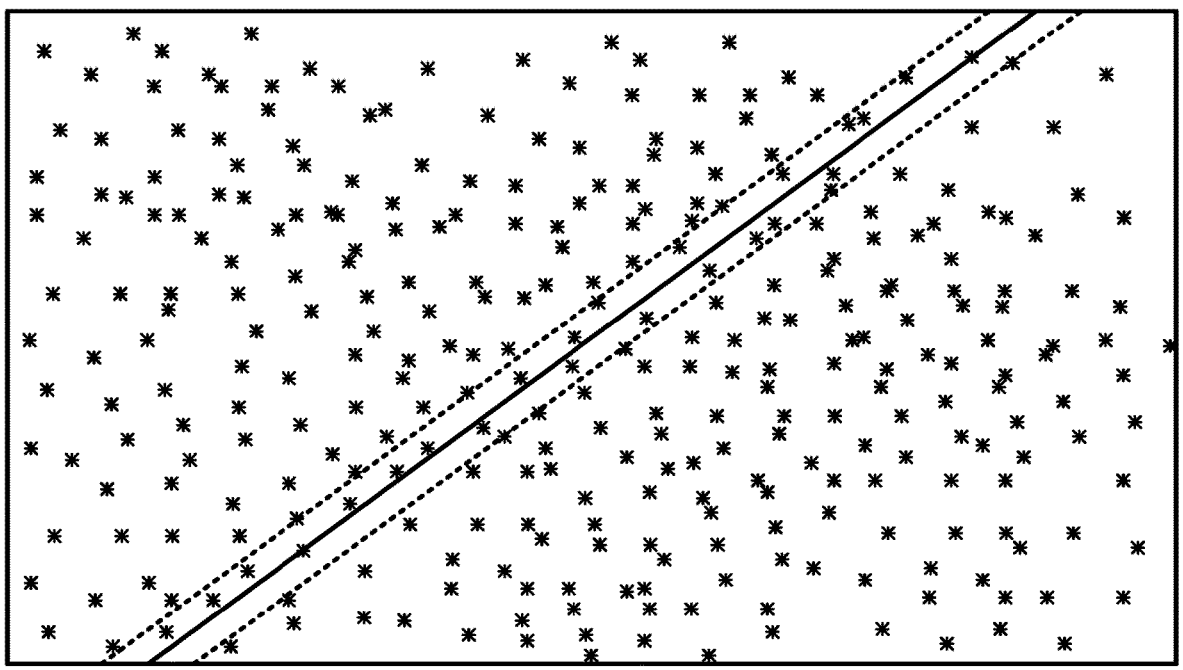
FIG. 2E illustrates the image of FIG. 2D depicting an example brightness profile of the satellite trail according to embodiments provided herein.

In Block 112, the brightness of the satellite trail is determined (FIG. 2E). In some embodiments, a function may be fit to the brightness data along the satellite trail. For example, a Gaussian or similar function may be employed. In some embodiments, brightness values of pixels along the satellite trail and a predetermined distance, such as a user-specified distance, from the satellite trail may be employed to fit a function (e.g., a Gaussian function) to the brightness data of the satellite trail. In some embodiments, pixels up to 6-20 pixels away from the satellite trail may be used to fit a function to the satellite trail brightness. In one or more embodiments, each point on the image may be characterized as having a distance along the satellite trail (parallel to the satellite trail) and a distance perpendicularly away from the satellite trail. The brightness function then may be represented by:

$$b(par, perp) = p(par)e^{\frac{-perp^2}{2\sigma^2}} \quad (1)$$

wherein par is the distance along (parallel) to the satellite trail and perp is the distance perpendicular to the satellite trail.

Figure 2F:
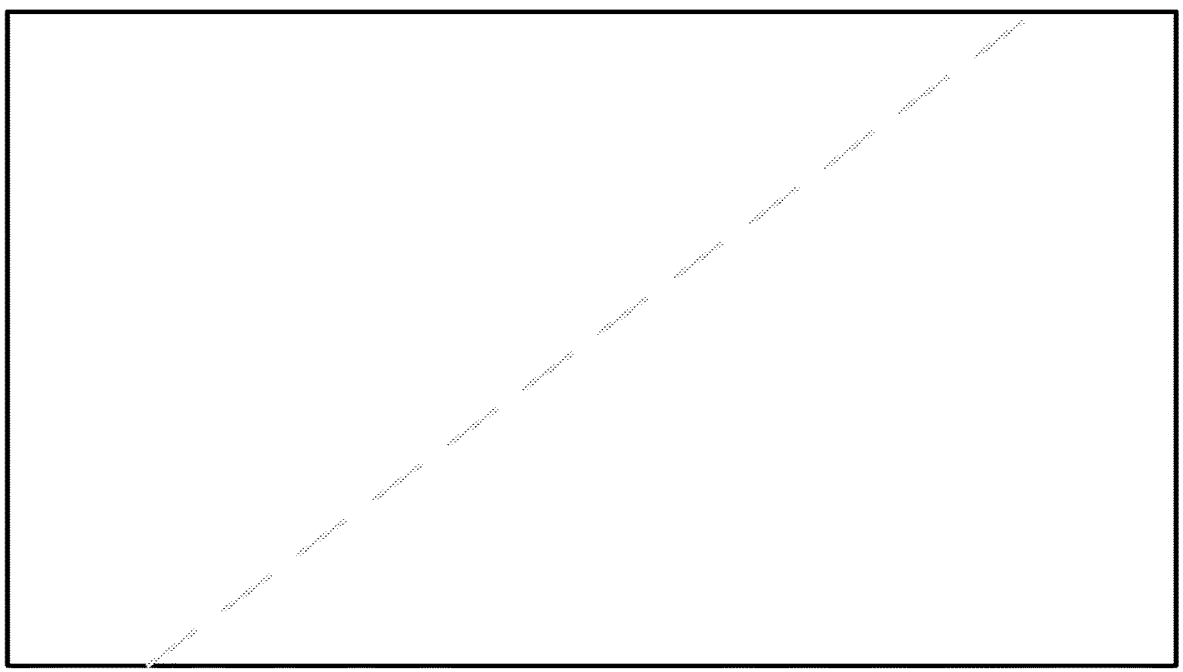
FIG. 2F illustrates the image of FIG. 2E with only satellite trail brightness information according to embodiments provided herein.

By fitting a curve to the brightness data along the satellite trail, a measure of the effects on the satellite trail may then be determined across the entire image. For example, in Block 114, the brightness function determined for the satellite trail may be used to calculate a brightness value for each pixel location within the initial image. This creates an image with only satellite trail brightness information (FIG. 2F). This image may then be subtracted from the initial image to remove the satellite trail (Block 116), as shown in FIG. 2G.

In general, a method of removing a satellite trail from an image is provided that includes (a) obtaining an initial image having stars (e.g., FIG. 2A); (b) locating stars in the image; (c) removing the located stars from the initial image to form a star-removed image (e.g., FIG. 2B); (d) locating the satellite trail in the star-removed image (e.g., FIG. 2C); (e) determining brightness information for the satellite trail in the initial image (e.g., FIG. 2E); (f) creating a satellite-trail-containing image with only satellite trail brightness information based on the determined brightness information (e.g., FIG. 2F); and (g) subtracting the satellite-trail-containing image from the initial image to remove the satellite trail so as to form a satellite-trail-removed image (e.g., FIG. 2G). Method 100 may include displaying the satellite-trail-removed image in some embodiments.

In some embodiments, a system 300 may be provided that includes a telescope 302 having an imaging device 304 in communication with and/or control of a controller 306, such as a microprocessor, smartphone, computer or the like. The controller 306 may include a memory 308 for storing instructions for carrying out one or more steps of one or more of the methods described herein. Controller 306 may receive images with satellite trails, remove the satellite trails from the images (as described herein) and, for example, display the images on a display 310 in communication with the controller.

Figure 2G:
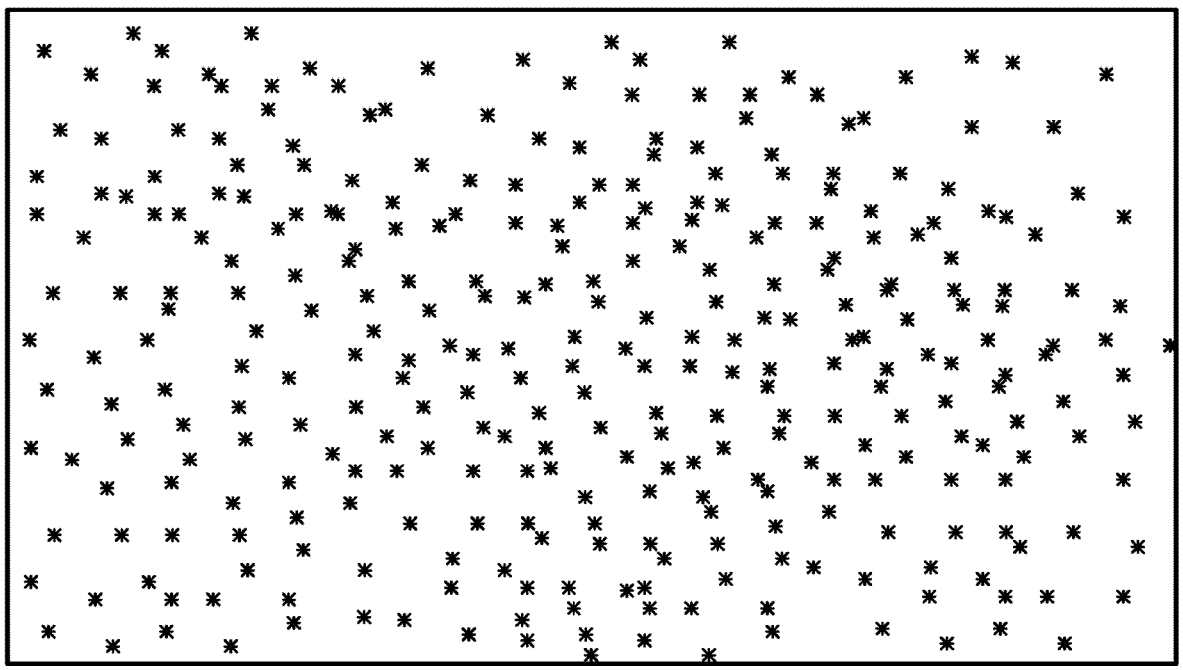
FIG. 2G illustrates the image of FIG. 2A with the satellite trail removed according to embodiments provided herein.
Figure 3:
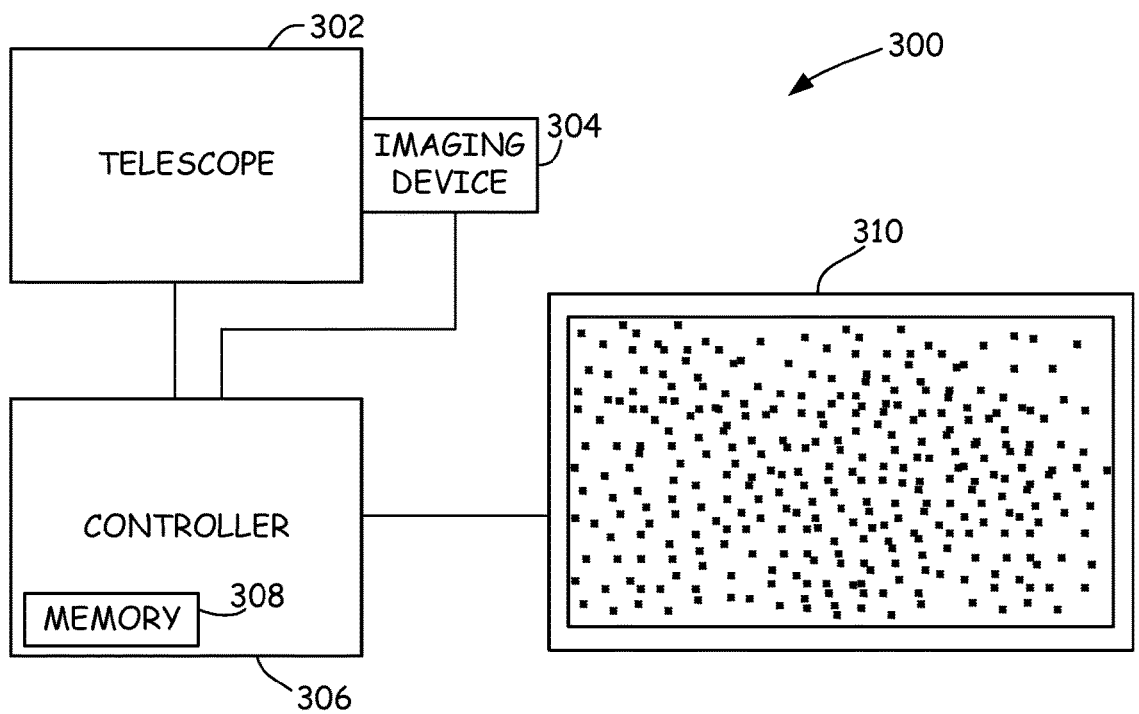
FIG. 3 illustrates a block diagram of a system for removing satellite trails from an image according to embodiments provided herein.

More particularly, in some embodiments, controller 306 when executing instructions stored in memory 308 may perform the following: receive an initial image having stars (see FIG. 2A), locate stars in the image, remove the located stars from the initial image to form a star-removed image (see FIG. 2B), locate the satellite trail in the star-removed image (see FIG. 2C), determine brightness information for the satellite trail in the initial image, create a satellite-trail-containing image with only satellite trail brightness information based on the determined brightness information (see FIG. 2F), and subtract the satellite-trail-containing image from the initial image to remove the satellite trail so as to form a satellite-trail-removed image (see FIG. 2G).

Accordingly, while the present invention has been disclosed in connection with the example embodiments thereof, it should be understood that other embodiments may fall within the spirit and scope of the invention, as defined by the following claims.

The invention claimed is:

1. A method of removing a satellite trail from an image comprising:
   obtaining an initial image having stars;
   locating stars in the image;
   removing the located stars from the initial image to form a star-removed image;
   locating the satellite trail in the star-removed image;
   determining brightness information for the satellite trail in the initial image;
   creating a satellite-trail-containing image with only satellite trail brightness information based on the determined brightness information; and
   subtracting the satellite-trail-containing image from the initial image to remove the satellite trail so as to form a satellite-trail-removed image.

2. The method of claim 1 further comprising displaying the satellite-trail-removed image.

3. The method of claim 1 wherein the initial image comprises a FIT or FITS file type image.

4. The method of claim 1 wherein the initial image is plate solved to locate the stars in the image.

5. The method of claim 1 wherein the removing the located stars comprises determining a radius of each star by detecting when brightness of the star drops as a function of radial distance from the star's center.

6. The method of claim 1 wherein the locating the satellite trail comprises:
   reducing resolution of the image to identify a brightest line extending through the image; and
   increasing the resolution of the image to refine location information of the brightest line.

7. The method of claim 1 wherein the determining brightness information for the satellite trail comprises employing brightness values of pixels along the satellite trail and a predetermined distance of the pixels from the satellite trail to fit a function representing brightness data along the satellite trail.

8. The method of claim 7 wherein the function is a Gaussian function.

9. The method of claim 7 wherein the function is represented by the Gaussian function:

$$b(par, perp) = p(par)e^{\frac{-perp^2}{2\sigma^2}}$$

Wherein b is brightness, par is the distance parallel to the satellite trail, p is a function dependent on par, σ is standard deviation, and perp is the distance perpendicular to the satellite trail.

10. A system for removing a satellite trail from an image comprising:
a telescope having an imaging device; and
a controller in communication with the telescope, the controller including a memory for storing instructions that when executed by the controller cause the controller to:
receive an initial image having stars;
locate stars in the image;
remove the located stars from the initial image to form a star-removed image;
locate the satellite trail in the star-removed image;
determine brightness information for the satellite trail in the initial image;
create a satellite-trail-containing image with only satellite trail brightness information based on the determined brightness information; and
subtract the satellite-trail-containing image from the initial image to remove the satellite trail so as to form a satellite-trail-removed image.

11. The system of claim 10 further comprising a display in communication with the controller, wherein the instructions stored in the memory when executed by the controller further cause the controller to display the satellite-trail-removed image on the display.

12. The system of claim 10 wherein the controller comprises a microprocessor, a smartphone, or a computer.

13. The system of claim 10 wherein the initial image comprises a FIT or FITS file type image.

14. The system of claim 10 wherein the initial image is plate solved to locate the stars in the image.

15. The system of claim 10 wherein the instructions stored in the memory when executed by the controller further cause the controller to locate stars in the image by determining a radius of each star by detecting when brightness of the star drops as a function of radial distance from the star's center.

16. The system of claim 10 wherein the instructions stored in the memory when executed by the controller further cause the controller to locate the satellite trail in the star-removed image by:
reducing resolution of the image to identify a brightest line extending through the image; and
increasing the resolution of the image to refine location information of the brightest line.

17. The system of claim 10 wherein the instructions stored in the memory when executed by the controller further cause the controller to determine brightness information for the satellite trail by employing brightness values of pixels along the satellite trail and a predetermined distance of the pixels from the satellite trail to fit a function representing brightness data along the satellite trail.

18. The system of claim 17 wherein the function is a Gaussian function.

19. The system of claim 17 wherein the function is represented by the Gaussian function:

$$b(par, perp) = p(par)e^{\frac{-perp^2}{2\sigma^2}}$$

wherein b is brightness, par is the distance parallel to the satellite trail p is a function dependent on par, σ is standard deviation, and perp is the distance perpendicular to the satellite trail.

20. The system of claim 10 wherein the instructions stored in the memory when executed by the controller further cause the controller to return the stars to the star-removed image in response to determining brightness information for the satellite trail in the initial image.

* * * * *